United States Patent [19]

Kakimoto et al.

[11] Patent Number: 4,517,575

[45] Date of Patent: May 14, 1985

[54] RECORDING PAPER CLAMPING APPARATUS

[75] Inventors: Atsushi Kakimoto, Yao; Masaaki Takita, Ibaragi, both of Japan

[73] Assignee: Matsushita Electric Industrial Co., Ltd., Kadoma, Japan

[21] Appl. No.: 457,079

[22] PCT Filed: Apr. 19, 1982

[86] PCT No.: PCT/JP82/00128

§ 371 Date: Dec. 20, 1982

§ 102(e) Date: Dec. 20, 1982

[87] PCT Pub. No.: WO82/03601

PCT Pub. Date: Oct. 28, 1982

[30] Foreign Application Priority Data

Apr. 20, 1981 [JP] Japan ................................ 56-60191

[51] Int. Cl.[3] ...................... G01D 15/28; B41F 27/06; B65R 5/14; G03G 15/00

[52] U.S. Cl. ................................ 346/138; 101/415.1; 271/277; 355/3 DR; 358/291

[58] Field of Search ............. 346/138, 75; 355/3 DR, 355/73; 358/291; 101/415.1; 271/4, 277

[56] References Cited

U.S. PATENT DOCUMENTS

| | | | |
|---|---|---|---|
| 2,767,610 | 10/1956 | Hintz et al. | 88/24 X |
| 3,093,436 | 6/1963 | Merli et al. | 346/125 |
| 3,101,234 | 8/1963 | Canamero | 346/138 |
| 3,695,757 | 10/1972 | Gregory | 355/3 |
| 3,854,715 | 12/1974 | Coleman | 271/277 X |
| 4,111,119 | 9/1978 | Takizawa et al. | 101/127.1 X |
| 4,225,872 | 9/1980 | Marinoff | 346/75 X |
| 4,259,695 | 3/1981 | Nakano | 358/291 |

FOREIGN PATENT DOCUMENTS

| | | | |
|---|---|---|---|
| 2380675 | 9/1978 | France . | |
| 36-7816 | 4/1961 | Japan . | |
| 42-1612 | 1/1967 | Japan . | |
| 50-109618 | 8/1975 | Japan . | |
| 5646254 | 9/1979 | Japan | 355/3 |
| 54-158516 | 11/1979 | Japan . | |
| 5799673 | 12/1980 | Japan | 355/3 |

*Primary Examiner*—E. A. Goldberg
*Assistant Examiner*—Gerald E. Preston
*Attorney, Agent, or Firm*—Cushman, Darby & Cushman

[57] ABSTRACT

The present invention relates to a recording paper winding apparatus for winding a recording paper on a rotary drum, by providing a bar for pinching a front end of a recording paper between the bar and the outer surface of a rotary drum, whereon a recording paper is to be sucked by making inside a negative pressure. Thus, the recording paper can be wound on the drum by a simple operation and held tightly thereon.

5 Claims, 14 Drawing Figures

RECORDING PAPER CLAMPING APPARATUS

FIELD OF THE INVENTION

The present invention relates to recording paper winding apparatus for winding a recording paper on a rotary drum in an on-demand ink jet recording apparatus or the like.

BACKGROUND OF THE INVENTION

Hitherto, one method of winding a recording paper around a rotary drum is by fastening the front and rear edge of the recording paper by two narrow bars onto the surface of the drum to fix the paper thereto. In this method, however, it is necessary to stretch and tightly contact the paper on the drum surface with very high accuracy.

In order to tightly contact the recording paper on the drum, there are methods of winding the paper around the drum by hand or the like, or by preliminarily fastening the rear end of the paper onto the drum surface by a narrow bar and fixing the paper at a predetermined position by pulling it. Accordingly, since a force is impressed on the drum for winding up the paper on the drum surface, the drum, especially its outer surface, must be strong. Therefore, some reinforcing structure must be added to the drum so that a decreasing of the weight of the drum is limited. This becomes a limitation in attempting to decrease the rotational inertia of the drum or to record at high speed by increasing the drum diameter.

Further, the holding parts of the narrow bar for fastening the end of the recording paper extend beyond the width of the paper at both ends of the drum. Therefore, if the drum rotates at high speed, the narrow bar is subject to centrifugal force so that its function of holding the recording paper is impaired. Accordingly, rotational speed of the drum cannot be very high.

There is still a further method of attaching recording paper to the drum by creating a negative pressure inside the drum. In this method, although there is an advantage in that there is no need of tightly contacting the recording paper on the drum by means of impressing an undesirable force on its outer surface, a complicated operation is necessary in order to maintain an accurate positional relation between the drum and the paper. Furthermore, in the event a shock is imposed on the front edge of the recording paper while recording or the front edge is bent up, then there is the shortcoming that the paper is liable to be peeled off the drum.

BRIEF DESCRIPTION OF THE INVENTION

The present invention provides a recording paper winding apparatus wherein there is provided, on the outer surface of a rotary drum having a negative pressure therein, a bar for pinching and fastening the front edge of the paper between the bar and the drum outer surface. The bar is disposed in a manner to open and close against the drum outer surface, and after the front edge of the paper is pinched by the bar as aforedescribed, the recording paper is wound around the drum, and further, is sucked and held against the drum's outer surface by the negative pressure inside the drum. Thus, the paper is held tightly on the drum even when the latter rotates at high speed so that high speed recording becomes possible.

DETAILED DESCRIPTION OF THE INVENTION

Figure 1:
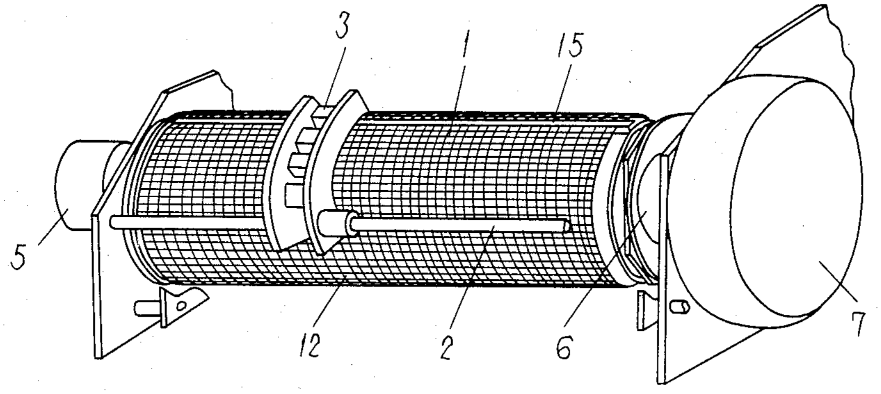
FIG. 1 is a perspective view of a rotary drum recording apparatus embodying the present invention.

Referring now to FIG. 1, there is shown a rotary drum 1 on the outer peripheral surface of which recording paper (not shown) is adapted to be wound. After the paper is so wound, by moving a recording head 3 longitudinally along a guide shaft 2, a recording can be made. The drum shaft 4 is coupled to a motor 5 for rotating the drum 1. The interior of the drum is connected to a suction blower 7 through an air passage 6 to create negative pressure inside the drum so that the recording paper is sucked onto and held against the exterior peripheral surface of the drum.

Figure 2:
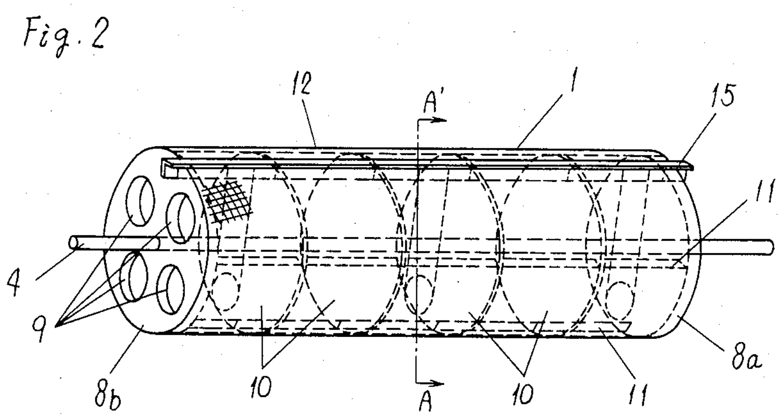
FIG. 2 is a more detailed perspective view of the rotary drum shown in FIG. 1.
Figure 4:
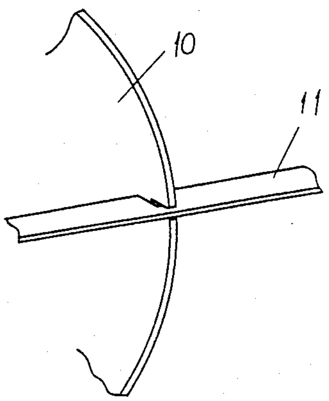
FIG. 4 is an enlarged fragmentary perspective view of a part of the drum shown in FIG. 3.

The drum 1 has disc-like end frames **8*a* and 8*b*, the latter being provided with holes 9 in communication with the air passage 6. Between the end frames 8*a* and 8*b* there are several intermediate frames 10, four such frames 10 being shown in FIG. 2. Preferably, the frames 10 are thin discs reinforced by thin longitudinal strips 11 having slots therein interengaged in peripheral slots in the discs 10, as shown in FIG. 4**.

Figure 3:
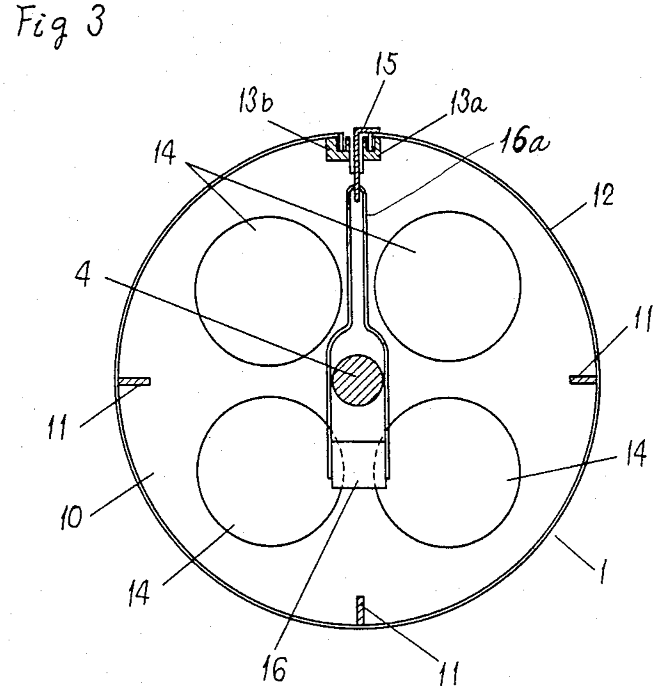
FIG. 3 is an enlarged sectional view taken on line A—A′ in FIG. 2.

The periphery of the drum 1 is formed by a lattice-like metal net 12 tightly engaged with the outer peripheries of the disc-like frames **8*a*, 8*b* and 10. Opposed longitudinal edges of the net 12 are fastened to longitudinal bars 13*a* and 13*b* fixed in respective peripheral recesses in the frames 8*a*, 8*b* and 10 so as to provide a gap between the bars, as shown in FIG. 3. Holes 14, are formed in the intermediate frames 10 and are large enough to make fluidic resistance of the passage of air therethrough very small in order to make the pressures in the interior spaces between the frames uniform even when sucking air from the hole 9 in the end frame 8*b***.

Figure 5:
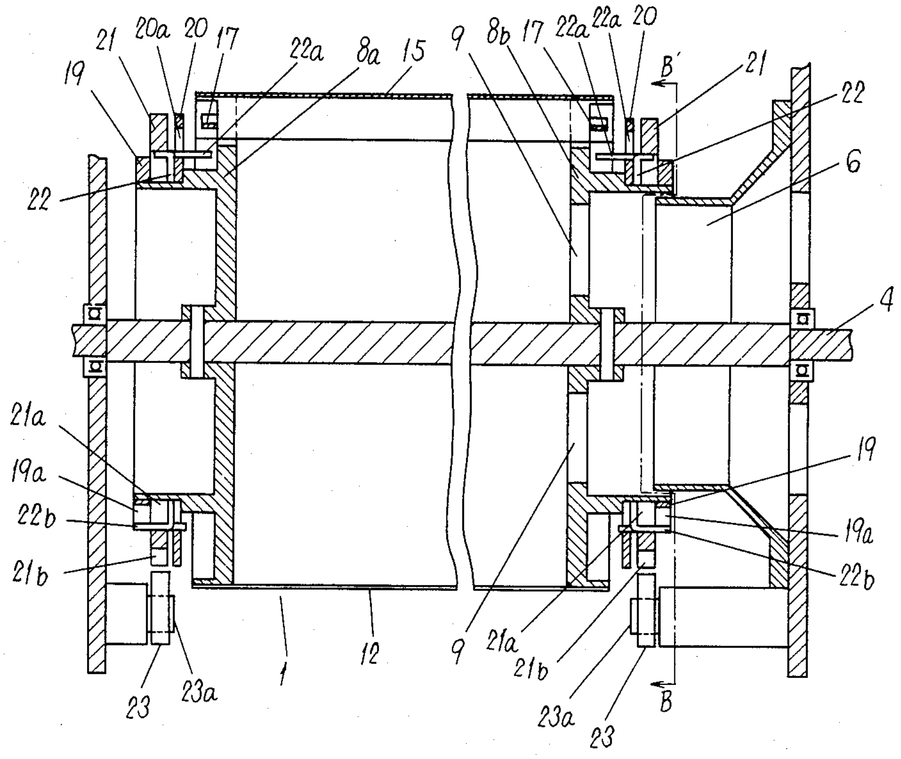
FIG. 5 is an enlarged longitudinal sectional view of the rotary drum shown in FIG. 2.
Figure 6:
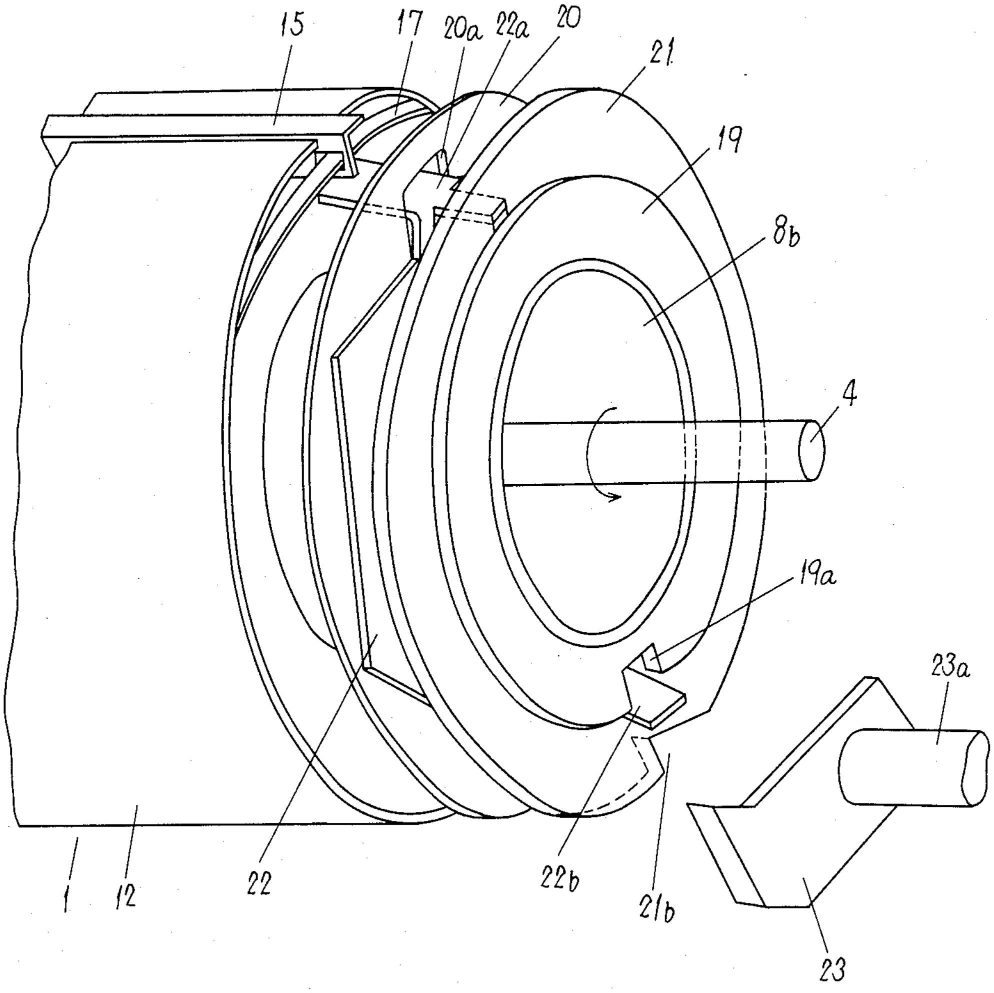
FIG. 6 is an enlarged fragmentary perspective view showing one embodiment of means to open and close the paper-pinching bar shown in FIG. 2.
Figure 7:
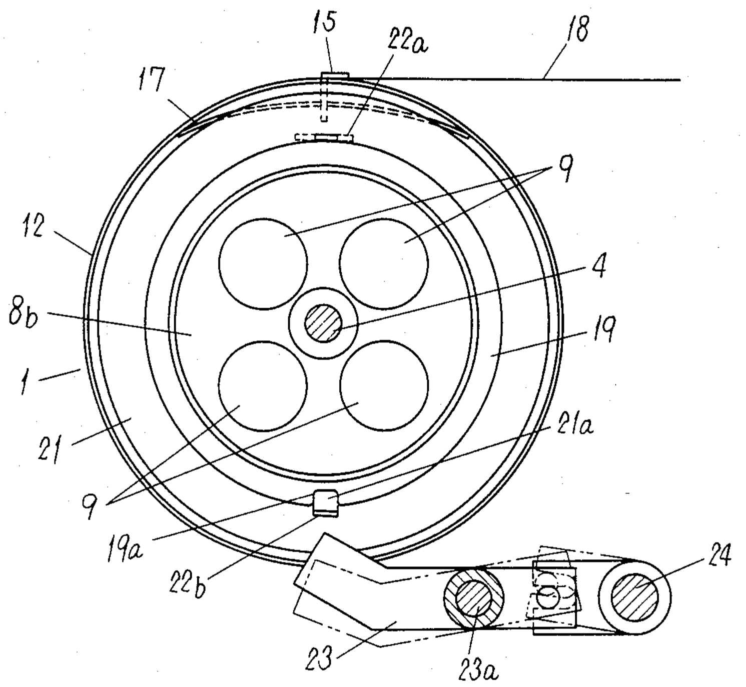
FIGS. 7–9 are end views taken on line B—B′ of FIG. 5 showing operation of the apparatus shown in FIG. 6.

A paper fastening bar 15 of L-shaped cross-section is adapted to pinch and fasten the front edge of the recording paper between it and the outer peripheral surface of the drum 1. For this purpose the bar 15 has a length almost the same as that of the drum 1 and is arranged with one edge or flange of the bar opposed to the outer surface of the drum to pinch the front or leading edge of the recording paper therebetween. The outer edge or flange of the bar 15 is freely insertable in the gap between the bars 13*a* and 13*b* so that by radial movement the bar 15 can open and close against the rotary drum 1. The one flange of the bar 15 is urged toward the outer surface of the drum 1 by leaf springs 17 at each end of the bar, each spring having its mid-section extending through an opening in the end portions of the other flange and its ends engaged against the inner surface of and exterior peripheral flange on the corresponding frame 8*a* or 8*b*, as shown in FIGS. 5 and 6. Centrifugal force on the bar 15 during rotation of the drum is counteracted by a weight 16 disposed on the side of the drum shaft 4 opposite the bar 15 and connected thereto by a forked link 16*a*, as shown in FIG. 3.

Referring now to FIGS. 5–9, there is shown a mechanism for closing and opening the bar 15. Since the mechanism is the same at each end of the drum 1, a description of one will suffice for both. A cam ring 19, fixed to the outer end of a coaxial circular flange projecting from the outer side of the end frames or 8*b*, has a slot in the periphery thereof on that side of the shaft 4 opposite the bar 15. A guide ring 20, of greater outer diameter than the cam ring 19, snugly but rotatably encircles the flange 19*b* inwardly of the cam ring. A lock ring 21, of substantially the same outer diameter as the guide ring 20, also rotatably encircles the flange 19*b* between the guide ring 20 and the cam ring 19. The inner diameter of the ring 21 is larger than the outer diameter of the cylinder flange 19*b* so that ring 21 can move radially thereon.

Between the rings 20 and 21 a slide plate 22 loosely encircles the cylindrical flange 19*b* so as to be movable radially thereon. An edge of the plate 22 carries a tongue or lever 22*a* which projects longitudinally inward through a guide opening 20*a* in the ring 20 into an annular recess in the outer side of the corresponding end frame 8*a* or 8*b*. When the lever 22*a* is radially aligned with the bar 15, the lever will open the bar on radialy outward movement of the lever. The lever 22*a* has an outwardly directed longitudinal extension engaged in a radial slot in the ring 21 so that the rings 20, 21 and plate 22 rotate as a unit. Diametrically opposite the lever 22*a*, the slide plate 22 has another tongue or lever 22*b* which projects through an opening 21*a* in the ring 21 to a position to engage and ride on the periphery of the cam ring 19. The periphery of the ring 19 is provided with a slot 19*a* diametrically opposite the bar 15 and into which the lever 22*b* can move when aligned therewith. Hence, when the drum 1 rotates to the position where the lever 22*b* is aligned with the slot 19*a*, the plate 22 can move radially to cause the lever 22*a* to open the bar 15.

The lock ring 21 has a notch 21*b* in its periphery engageable by a detent 23 carried on one end of a lever pivoted on a fulcrum 23*a*. Engagement of the detent in the notch 21*b* prevents rotation of the ring 21 while the ring 19 continues to rotate until the lever 22*b* is aligned with and is pushed into the slot 19*a* by the action of the detent 23 which also can then push the ring 21 radially upward to push the plate 22 to open the bar 15. When the lever 22*b* is in the slot 19*a*, the rotary drum is locked in a predetermined position. The detents 23 at both ends of the drum 1 are moved synchronously by a rock shaft 24 (FIG. 7) so both ends of the bar 15 open and close synchronously.

Figure 9:
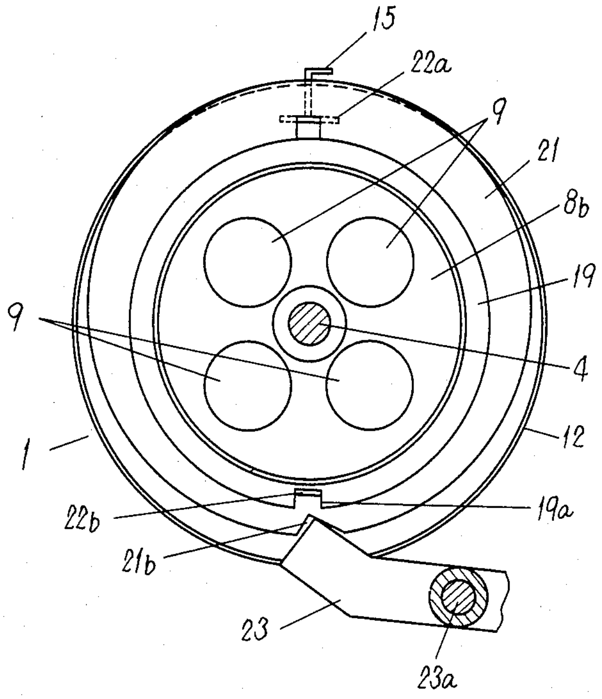

In this embodiment, when the drum is rotated by the motor 5, the cam ring 19 fixed to the corresponding side frame 8*a* or 8*b* is rotated at the same speed as that of the drum, while the lock ring 21, the guide ring 20 and the slide plate 22 rotate at a speed slower than that of the rotary drum because of their non-fixation on the shaft 4. For winding the recording paper 18, the detent 23 is resiliently urged by the rock shaft 24 against the peripheral edge of the ring 21 until the notch 21*b* is in a position where the detent engages therein and stops rotation of the lock ring 21, the guide ring 20 and the slide plate 22 with the lever 22*a* positioned uppermost to such movement of the detent 23 also actuates a switch (not shown) to shut off the motor 5. Thereafter, the drum 1 and cam ring 19 continue to rotate by inertial until the slot 19*a* is in a position to receive the lever 22*b*. At this time the detent 23 pushes the ring 23 radially upward which, in turn, pushes the lever 22*b* into the slot 19*a*. The engagement of the lever 22*b* in the slot 19*a* stops the rotation of the drum 1 with the bar 15 is positioned uppermost in radial alignment with the lever 22*a*. At the same time, the lock ring 21 is pushed up radially by the detent 23 and carries with it the slide plate 22 so that the lever 22*a* moves up to push the bar 15, as shown in FIG. 9, to allow the front edge of the paper to be inserted therebeneath.

Figure 8:
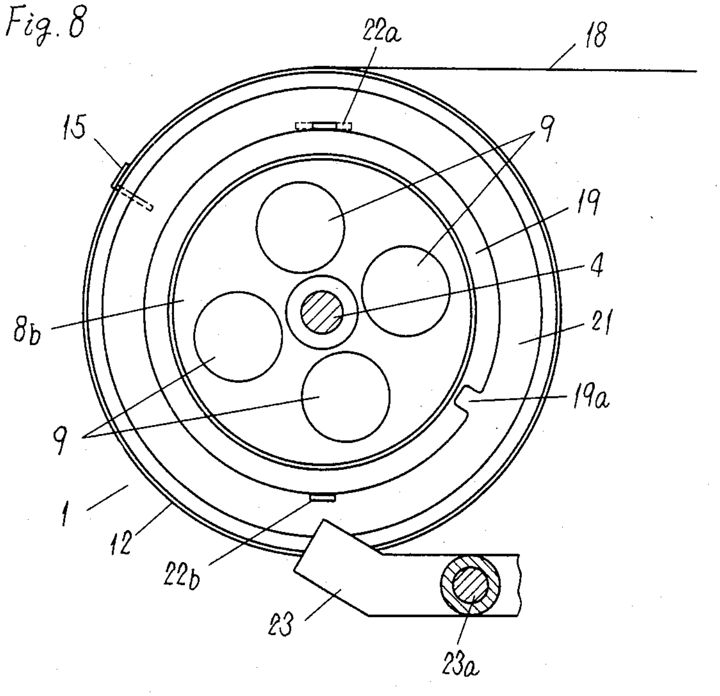

Therefore, as shown in FIG. 8, the detent 23 is partially released so that the bar 15 will move radially inward and pinch and fasten the paper against the drum. Also the lever 22*b* will move out of the slot 19*a* to release the drum 1 for rotary movement. At the same time the motor 15 starts and winds the paper around the drum 1 as shown in FIG. 8.

As the recording paper 18 is wound on the drum, a negative pressure is generated inside the drum. When the paper 18 is wound around the entire circumference of the drum 1, since the air resistance of the recording paper 18 is high, the negative pressure inside the drum 1 increases so that the recording paper is sucked against the outer surface of the drum with a uniform force. The detent 23 is then moved out of the notch 21*b* of the lock ring 21, so that rotation of the drum 1 advances to a high speed for recording.

Figure 10:
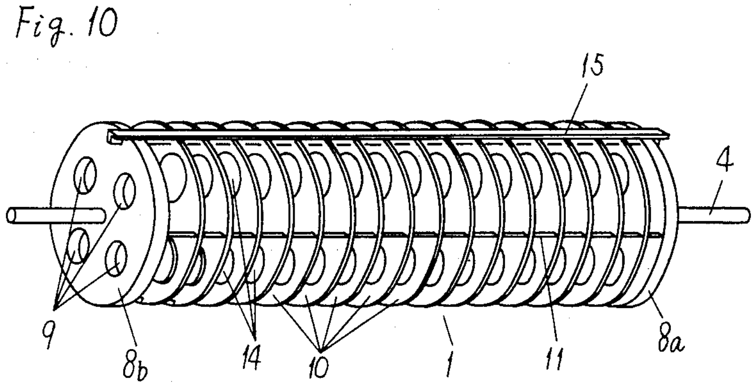
FIGS. 10 and 11 are perspective views showing other embodiments of the rotary drum shown in FIG. 2.

FIG. 10 shows another embodiment of a rotary drum embodying this invention. In this embodiment, the net 12 forming the outer surface of the drum 1 is omitted and, instead, there is a large number of intermediate frames 10 disposed in closely spaced relation to define the peripheral surface of the drum 1. When a recording paper 18 is wound around such an outer surface, the interior negative pressure sucks the recording paper 18 against the frames 10. Although, in this embodiment, the recording paper 18 is subject to an inwardly directed suction force, by suitably selecting the spacing between the frames 10, the degree of deformation of the paper 18 between the frames can be kept within such a range that the necessary proper spacing between the paper and the recording head 3 can be retained.

Figure 11:
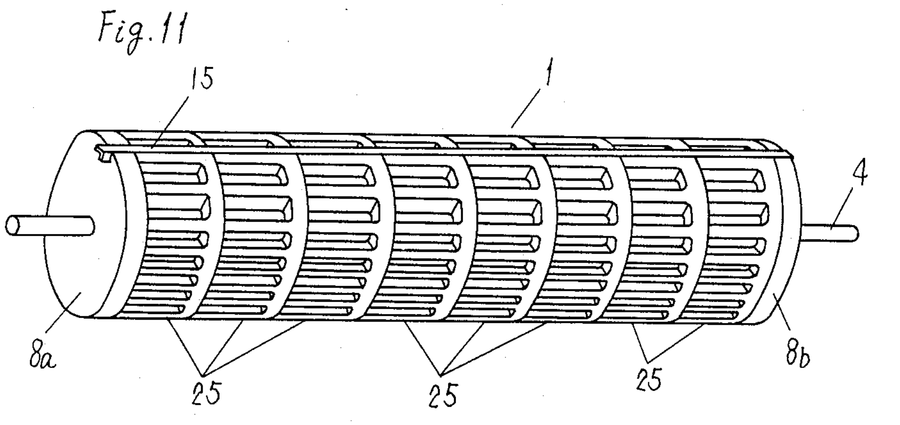
Figure 12:
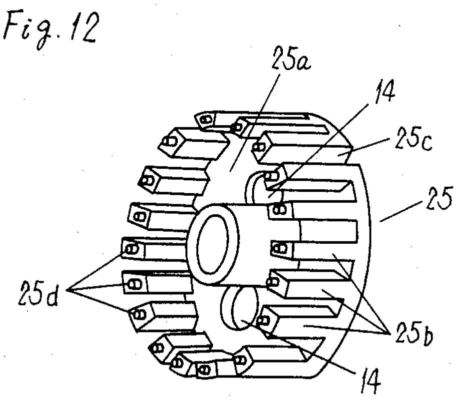
FIG. 12 is a perspective view of a component of the drum shown in FIG. 11.

FIGS. 11 and 12 show another embodiment of the rotary drum 1. This embodiment uses frames 25 having a plurality of ribs 25*b* extending longitudinally from one side of the peripheral portion of a disc 25*a*. The rotary drum 1 is formed by an assemblage of such frames 25 with an end frame 8*a* or 8*b*. The end frame 8*b* or disc 25*a* has holes 14 therein similar to the embodiment shown in FIG. 2. At one part of the periphery of the disc 25*a* slits 25*c* are formed therein for reception of the bar 15. Furthermore, at the tips of the ribs 25*b*, pins 25*d* are provided for fitting in holes (not shown) formed on the disc 25*a* of an adjacent frame 25 in order to couple the frames 25 together.

Figure 13:
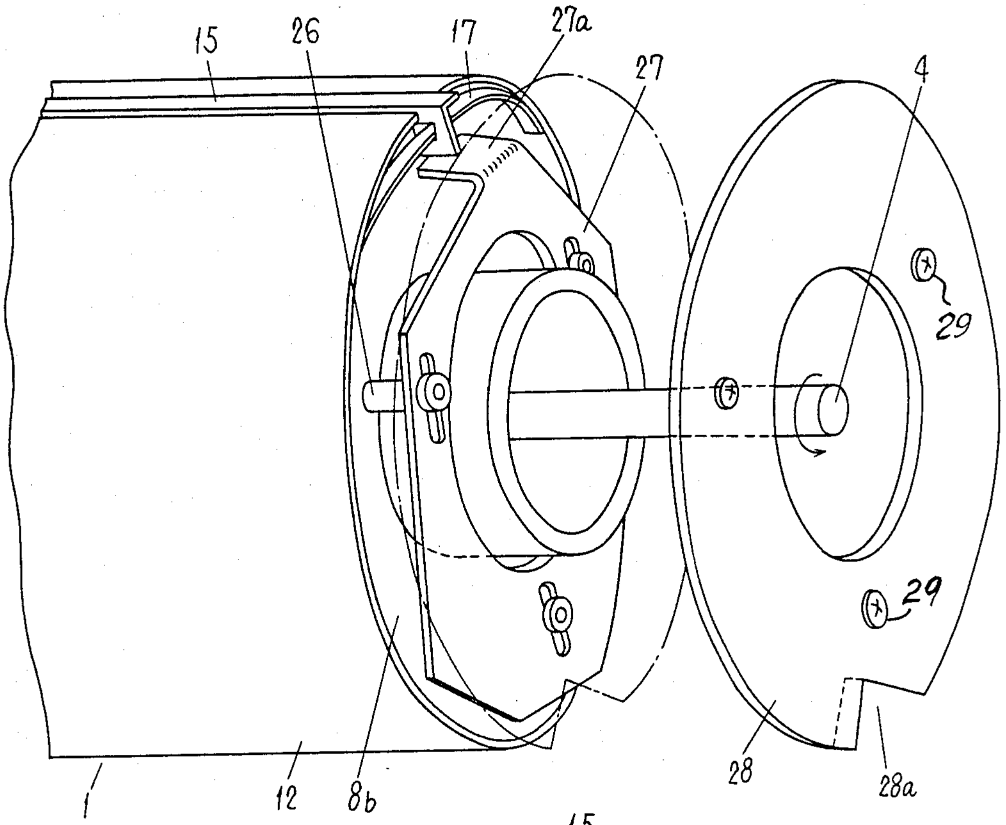
FIG. 13 is a perspective view corresponding to FIG. 6 showing another embodiment of means to open and close the paper-pinching bar.
Figure 14:
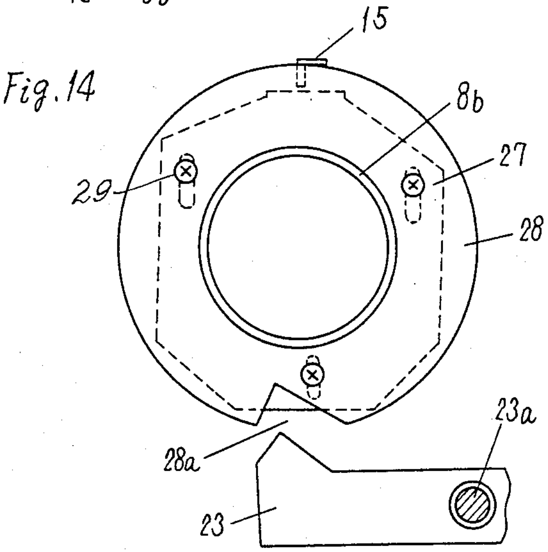
FIG. 14 is an end view showing some of the mechanical parts shown in FIG. 13.

FIGS. 13 and 14 show another embodiment for means of opening and closing the bar 15. In this embodiment, a slide plate 27 having a tongue or lever 27a for opening and closing the bar 15 is mounted radially slidable of the rotary drum through a number (three being shown) of pins 26 projecting longitudinally outwardly from the corresponding end frame 8a or 8b of the drum 1 into appropriate guide slots in the plate 27. A lock ring 28 having a peripheral notch 28a is mounted on the ends of the pins 26 in such a manner that a part of the slide plate 27 overlaps the notch 28a. Screws 29 secure the lock plate 28 to the pins 26.

In this embodiment, the slide plate 27 and the lock plate 28 rotate together with the rotary drum 1. To wind recording paper 18 on the drum, the motor 5 is shut off. At this time, the detent 23 rides on the peripheral edge of the lock plate 28. As the drum 1 continues to rotate by inertia, the tip of the detent 23 engages the notch 28a of the lock plate 28 and stops rotation of both the latter and the drum 1. At the same time, the slide plate 28 is pushed up by the detent 23 so that the lever 27a pushes up the bar 15 to receive the forward edge of the paper 18. When the motor 5 is restarted, the lever 23 is actuated to move out of the notch 28a, the plate 27 moves to pinch the paper 18, and the drum begins to rotate. In this way, winding of the recording paper around the drum is carried out.

INDUSTRIAL UTILITY

As has been explained, in accordance with the apparatus of the present invention, the combination of a lever to pinch and hold the front end edge of the paper between it and the outer surface of a rotary drum which attracts the paper by a negative pressure therein, there is provided a simple operation to fasten the front end edge of the recording paper to the drum, so that the paper is wound around the drum and held tightly thereagainst by suction even during high speed rotation. Further, since a structurally strong drum is not required, the drum can be made lighter in weight with a consequent decrease in its rotational inertia and increase in permissible speed of rotation.

We claim:

1. Recording paper winding apparatus comprising:

a rotary drum having an air-pervious circumferential periphery for winding recording paper thereon, said drum having a longitudinal slot in said periphery;

means for creating a negative pressure in said drum when paper is wound thereon;

a bar having an L-shaped section arranged with one flange thereof movable radially in said slot and the other flange thereof opposed to said drum periphery for pinching therebetween the front end of recording paper so that rotation of said drum will wind the paper therearound with the paper being held tightly on said drum by the negative pressure therein;

means engaged with said bar and drum for urging said bar to pinching position;

motor means for driving said drum; and means engageable with said drum for stopping rotation thereof with said bar uppermost when said motor means is shut off, for raising said bar to paper-receiving position, and for allowing said bar to return to paper pinching position after the front end of the paper has been inserted between said one flange and said drum periphery, to wind the paper therearound when the motor means is restarted and thus hold the paper tightly on said drum by the negative pressure therein, said engageable means including:

bar-engaging and raising means mounted to the ends of said drum for rotation about the axis thereof and for linear movement diametrically of said axis;

disc means mounted to said drum ends for rotation about said axis and having notch means in the periphery thereof; and detent means engageable in said notch means for stopping rotation of said drum with the bar uppermost and for pushing said bar-engaging and raising means upward to engage and raise said bar.

2. The apparatus defined in claim 1 including means fixing the disc means to the drum for rotation therewith and wherein the bar-engaging and raising means overlaps the notch means for engagement by the detent means 3. The apparatus defined in claim 1 wherein the disc means is rotatable relative to the drum and including disengageable means to lock said disc means to said drum for rotation therewith, said disc means being diametrically movable, when so locked, by said detent means to engage and raise said bar-engaging and raising means.

4. A recording paper winding apparatus in accordance with claim 1 which is characterized in that said rotary drum periphery comprises a metal net forming the outer surface and including disk shaped frames for holding said metal net.

5. A recording paper winding apparatus in accordance with claim 1 which is characterized in that said rotary drum periphery is defined by a plurality of closely axially-spaced disk-shaped frames mounted on a shaft.

* * * * *